United States Patent
Hicks

(10) Patent No.: US 10,627,512 B1
(45) Date of Patent: Apr. 21, 2020

(54) EARLY FUSION OF LIDAR RETURN DATA WITH CAMERA INFORMATION

(71) Applicant: Luminar Technologies, Inc., Orlando, FL (US)

(72) Inventor: Richmond Hicks, Oviedo, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/204,910

(22) Filed: Nov. 29, 2018

(51) Int. Cl.
  *G01S 17/02* (2020.01)
  *G06T 7/50* (2017.01)
  *G01S 17/93* (2020.01)

(52) U.S. Cl.
  CPC .......... *G01S 17/023* (2013.01); *G01S 17/936* (2013.01); *G06T 7/50* (2017.01)

(58) Field of Classification Search
  CPC ........ G01S 17/936; G01S 17/023; G06T 7/50
  See application file for complete search history.

(56) References Cited

U.S. PATENT DOCUMENTS

| | | | | |
|---|---|---|---|---|
| 6,664,529 | B2 * | 12/2003 | Pack | G01S 7/481 250/208.1 |
| 9,672,446 | B1 * | 6/2017 | Vallespi-Gonzalez | G06K 9/6267 |
| 9,761,002 | B2 * | 9/2017 | Mundhenk | G06T 7/593 |
| 10,121,082 | B2 * | 11/2018 | Heisele | B60R 1/00 |
| 10,157,497 | B2 * | 12/2018 | Bybee | G06T 15/04 |
| 10,176,596 | B1 * | 1/2019 | Mou | G06T 7/80 |
| 2002/0060784 | A1 * | 5/2002 | Pack | G01S 7/481 356/6 |
| 2010/0207936 | A1 * | 8/2010 | Minear | G06T 7/30 345/419 |
| 2012/0081544 | A1 * | 4/2012 | Wee | G01S 17/023 348/140 |
| 2014/0071121 | A1 * | 3/2014 | Russ | G01S 17/89 345/419 |
| 2017/0039436 | A1 * | 2/2017 | Chen | G06K 9/00798 |
| 2017/0103269 | A1 * | 4/2017 | Heisele | G06K 9/00805 |
| 2017/0200273 | A1 * | 7/2017 | Kamilov | H04N 5/23232 |
| 2017/0242442 | A1 * | 8/2017 | Minster | G05D 1/0248 |
| 2017/0309066 | A1 * | 10/2017 | Bybee | G06T 17/05 |
| 2017/0314930 | A1 * | 11/2017 | Monterroza | G06N 3/08 |
| 2018/0079424 | A1 * | 3/2018 | Myers | B60W 40/06 |
| 2018/0101177 | A1 * | 4/2018 | Cohen | G05D 1/0246 |
| 2018/0232947 | A1 * | 8/2018 | Nehmadi | G06T 17/05 |
| 2018/0316873 | A1 * | 11/2018 | Wei | H04N 5/265 |
| 2019/0004535 | A1 * | 1/2019 | Huang | G05D 1/0251 |
| 2019/0052844 | A1 * | 2/2019 | Droz | H04N 5/23296 |

(Continued)

OTHER PUBLICATIONS

M. Mauthner, W. Elmenreich, A. Kirchner and D. Boesel, Out-of-Sequence Measurements Treatment in Sensor Fusion Application: Buffering versus Advanced Algorithms, Workshop Fahrerassistenzsysteme, p. 20-30, 2006 (Year: 2006).*

(Continued)

*Primary Examiner* — Peter D Nolan

(57) ABSTRACT

Lidar return data is fused early with camera information. In one embodiment, a voxel is detected in a frame of a lidar corresponding to an external scene. The voxel is mapped to a patch in a frame of a camera of the external scene corresponding to the voxel. The patch has a plurality of pixels. Each pixel has a plurality of color values. The voxel is augmented with the patch of pixels and the augmented voxel is delivered to a perception engine.

20 Claims, 10 Drawing Sheets

(56) References Cited

U.S. PATENT DOCUMENTS

2019/0120948 A1* 4/2019 Yang ................. G01S 7/497
2019/0132572 A1* 5/2019 Shen ................. G06K 9/00718

OTHER PUBLICATIONS

Daraei, et al., "Velocity and Shape from Tightly-Coupled LIDAR and Camera," University of California, Santa Cruz, Jun. 1, 2017 (9 pages).

* cited by examiner

EARLY FUSION OF LIDAR RETURN DATA WITH CAMERA INFORMATION

TECHNICAL FIELD

The present description relates generally to lidar and in particular to lidar return data fusion using camera data.

BACKGROUND

Autonomous vehicle (AV) navigation in some cases uses lidar and cameras to create a high resolution three-dimensional (3D) model of the surroundings of the vehicle. The 3D model is formed by combining information from multiple sensors in a system to generate a 3D point cloud. The point cloud, along with other sensor data including cameras, may then be fed into a perception system which will detect and classify objects relevant to the driving task. A similar approach can be used outside of AV navigation for a variety of mobile and fixed observation systems.

Lidar can generate a 3D position for any object that reflects the illumination from the lidar. These positions can then be used as the basis of a 3D point cloud. The cloud can be used as the 3D model or combined with other sensor data and analysis to generate the 3D model of the surroundings.

Visible and near infrared light cameras are small inexpensive sensors that provide detailed information at a high sampling rate. The detail is particularly helpful in object detection, identification, and localization. The high sampling rate is particularly helpful in determining motion (motion vector generation). However, cameras do not provide accurate or reliable range information and they do not image objects that are not emitting or reflecting light. When camera data is added to lidar data a much more complete understanding of the scene can be obtained. Combining lidar and camera data is sometimes referred to as fusion.

BRIEF DESCRIPTION OF THE DRAWINGS

The appended claims set forth the features of the invention with particularity. The present invention is illustrated by way of example, and not by way of limitation, in the figures of the accompanying drawings in which like reference numerals refer to similar elements.

DESCRIPTION OF EXAMPLE EMBODIMENTS

As described herein, an early fusion system maps lidar voxels in a lidar frame to corresponding patches (groups of pixels) in a sequence of frames from a camera. The information from each patch over multiple frames may be analyzed to determine a 3-axis motion vector for the voxel. The RGB patch may be further scaled or downsampled as a function of range to further reduce the data. For example a voxel with azimuth, elevation and range from the lidar can be augmented with color from the camera RGB sensors and motion from the multiple pixels and frames of each patch. When passed to a perception engine, this information may be used for object detection and classification to generate a 3D model of the surroundings.

Scanning lidars measure a single point at a time. The rate of scanning is limited by the round trip travel time at the speed of light to the most distant target to be discriminated. For any particular cost i.e. a fixed number of lasers and detectors, there is a tradeoff between resolution and frame rate. A common automotive lidar might operate at 10-20 frames/second with 32-64 lines of resolution (e.g. 64K voxels). A visible light camera captures many pixels concurrently and is not affected by round trip travel time. This allows for much higher spatial and temporal resolution. Automotive cameras coming to market are able to capture at 30-40 frames/second with more than 2,000 lines of resolution (e.g. 8M pixels). A good early fusion that maximizes the information content while minimizing the data allows higher resolution without increasing the bandwidth to the perception engine or increasing the perception engine compute requirements.

Early fusion seeks to combine lidar and camera data prior to sending the information to a perception engine. Early fusion can be used to minimize the amount of data sent to the perception engine, reducing compute and bandwidth requirements of a practical system, but the importation information should also be preserved. Late fusion runs the lidar and camera data through separate perception engines and combines the results at the object level. Early fusion offers a possibility to reduce the total amount of data sent to the perception engine and to remove the fusion processing load from the perception engine.

To perform early fusion and reduce the data bandwidth requirements, the disparate sources, lidar, camera, etc. that generate very different data are combined. A camera can generate a large amount of data compared to the lidar. This data requires significant transfer, buffer, and processing resources. A better system will maintain the strengths of each sensor in the data output while overcoming weaknesses in the combination of sensor data.

Figure 1:
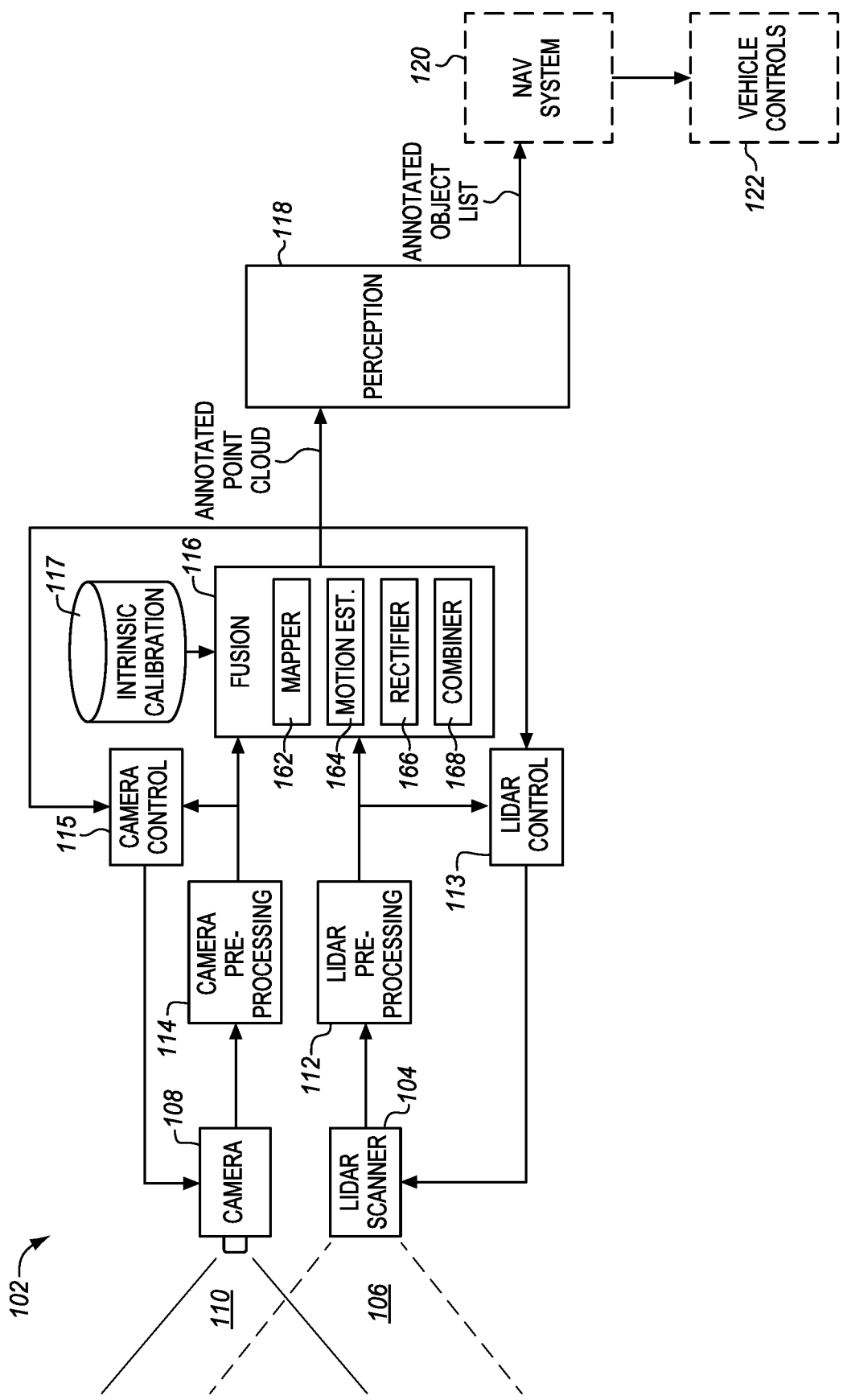
FIG. 1 is a block diagram of an example sensor system with a lidar and a camera.

FIG. 1 is a block diagram of a sensor system with a lidar 104 augmented with a visible light camera 108. The sensor system 102 has a lidar with a lidar field of regard 106 and a visible light camera with a camera field of regard 110. The two fields of regard overlap so that objects imaged by the camera are within the point cloud generated by the lidar. The scene within the fields of regard may be of a portion of the road in front of the vehicle and along which the vehicle is traveling. Other scenes may be views to the side and to the rear.

The lidar system has a lidar 104 coupled to a lidar controller 113 that drives and controls the lidar. The lidar output data is coupled to a lidar pre-processor 112 that receives return data generated by the lidar. There may be an optical system optically coupled to or integrated within the lidar system for directing laser pulses to the scene and laser reflections into a detector of the lidar 104. The lidar controller may be integrated into the lidar or the pre-processor or implemented as multiple components. The lidar pre-processor generates a point cloud in which each point represents a three-dimensional position in the scene in the field of regard. The particular configuration, resolution, and other information generated by the lidar processor and the manner of operation of the lidar processor may be modified to suit different implementations. The point cloud is sent to a fusion processor 116 which generates an annotated point cloud after fusion to be used by a perception engine 118 of the system. The fusion processor may alternatively be a part of the perception engine or independent as shown.

A navigation system, such as an autonomous vehicle (AV) navigation system may include a visible light camera for many purposes including to recognize traffic signs and signals that are not visible in the NIR (Near Infrared) or SWIR (Short Wavelength Infrared) spectrum that would typically be detected by the lidar. The visible light camera will have color information to distinguish, for example, symbols and numbers on a sign from the background of the sign. A typical lidar lacks color information, particularly in the visible light spectrum of the sign. It may also not have resolution high enough to read or distinguish signs at the required range. As a result, the visible light camera is very well suited to object detection and classification and there has been significant work on detection and classification methods for color images. The lidar has difficulty identifying some objects based only on the lidar data, but is very well-suited to determining distance, and size, and to tracking movement.

The visible light camera system has a camera 108 that generates digital images of the scene within its field of regard 110 as determined by an optical system that focuses light generated by or reflected from the scene onto a sensor of the camera 108. The images are sent to an image pre-processor 114 that is coupled to the camera. In embodiments, the camera operates at a frame rate and generates a new image or frame at a rate determined by the frame rate. The camera is also coupled to a camera controller 115. The frame rate may be determined by the camera controller or the image pre-processor or other upstream component. Alternatively, the camera may capture an image in response to a command from an external controller such as the perception engine 118 through the camera controller. The images may be 2D color representations of the scene. In some implementations, multiple cameras are used to determine depth or range from the cameras to the scene. Multiple cameras may also be used to provide information at different light wavelengths or with different fields of view.

A variety of different visible light cameras may be used, such as CMOS (Complementary Metal Oxide Semiconductor) or CCD (Charge Coupled Device) cameras, with different color and sensitivity characteristics. Visible light is suggested because objects designed for human perception are best perceived using visible light. In addition, visible light cameras and image processors are commonly available. The camera may have a different or extended spectrum so that only some colors are perceived or so that infrared or ultraviolet are also perceived by the camera. While 2D images are discussed herein, the camera may be replaced with a multiple sensor or 3D camera so that 3D images are provided and analyzed for object classification. For some object classification techniques, a 3D image provides more accurate results.

The fusion processor 116 combines the lidar point cloud and the camera image data and any other suitable system information to generate an annotated point cloud that represents the scene. Calibration data 117 is also provided to the early fusion processor to improve the accuracy of annotating the point cloud. The lidar and the camera frames will not be perfectly matched and may have different distortions with respect to the real world. The optical systems may be adjusted to improve alignment and the physical mounting structures for the two systems may be configured to reduce independent movement of the two systems. However, with higher resolution, the precision of the alignment must also be improved. In embodiments, the two fields of view are calibrated and correction or calibration factors 117 may be determined to correlate frames of the camera with frames of the lidar.

The fusion engine performs several functions which will be described in more detail below. These functions may be performed with specialized hardware, parallel pipelines, or general purpose processing. As shown, the fusion processor 116 includes a mapper 162 to map voxels to pixels and patches. It includes a motion estimator 164 to estimate motion of the mapped patches. It includes a rectifier 166 to correct the patches for distortions and for the lidar positions. It also includes a combiner 168 to combine all of the data with the voxel data and generate the augmented voxels to form the annotated point cloud. Some embodiments may include more or fewer functions or modules than the four that are shown.

The point cloud from the fusion engine 116 will include the position of each lidar voxel in three dimensions augmented by camera image data. The point cloud is provided to a perception engine 118 which applies perception techniques to the point cloud. This may include object classification that allows the future behavior of the object to be predicted. As an example, a tree will remain stationary and the outer periphery of the tree will likely bend in a collision. A pedestrian may move in any direction at any time, but will never move very fast. Perceiving the sizes and positions of particular objects in the scene allows the scene to be more fully characterized.

In some cases, the perception engine produces a 3D scene model. The 3D model may be used for any of a variety of different purposes. In this example, the model is optionally provided to a vehicle navigation system 120. The vehicle navigation system is optionally coupled directly or indirectly to vehicle controls 122 to direct the vehicle on an intended path. The vehicle is referred to herein primarily as an automobile but the systems and methods described herein are not so limited. Any type of land vehicle whether it drives on roads, paths, guideways, tracks, or open areas, indoors or outdoors, may benefit from the sensor and scene modeling systems described herein. Water vehicles, such as boats, ships, or submarines and airborne vehicles may also benefit from the systems and methods described herein. In addition while the system is described as having a field of regard in a direction of forward travel, sensors may be directed in other directions and additional sensors may be used to observe multiple directions simultaneously. The 3D model may include objects in multiple different directions from the vehicle.

For simplicity, the description herein treats the camera and the lidar as if there is a direct and one-to-one correlation between the camera field of regard 110 and the lidar field of regard 106. In practice this is not necessary and may not be desired. There may be multiple cameras and multiple lidars and respective fields of view may not match. There may also be areas seen by a camera but not a lidar and vice versa. As an example, there may be multiple narrow field of view cameras to achieve the desired resolution for far distances. A high resolution camera with a wide field of view may be large and expensive compared to multiple narrower field of view cameras with the same resolution. Smaller cameras with smaller fields of view might be used to cover the lidar field of regard. Similarly, a lidar with a smaller field of regard may be able to perform a scan more quickly than a lidar with a wider field of regard. There may also be additional sensors for areas directly in front of a moving vehicle. Accordingly, the systems and methods herein may be adapted to suit different sensor suite designs.

Figure 2:
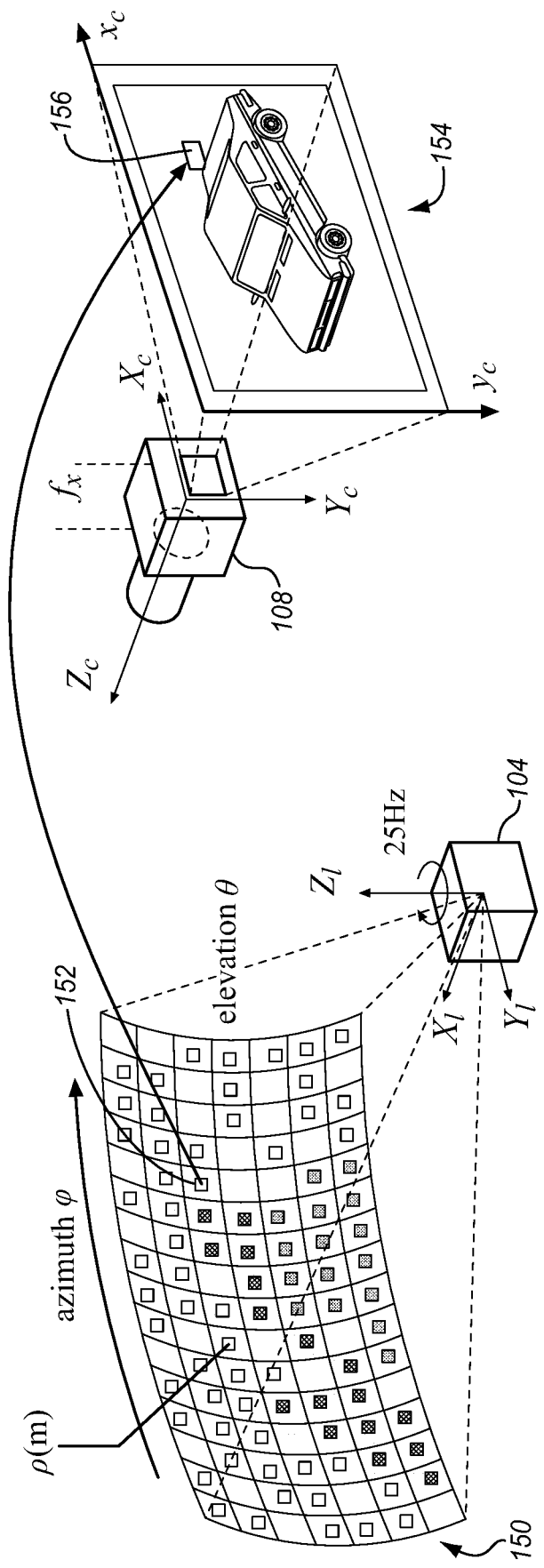
FIG. 2 is a diagram of lidar and camera outputs to with example relative parameters and coordinate systems.

FIG. 2 is a diagram of lidar and camera outputs to show example relative parameters and coordinate systems. The lidar 104 can be characterized as producing a frame 150 with a plurality (e.g. thousands) of voxels (volume elements). Each voxel can be characterized by a position in the frame and by a position in real space. The lidar operates by detecting reflection of a light beam from objects in real space. The frame may be characterized as a portion of a sphere centered on the beam source or the detector. Spherical coordinates can be range ($\rho$), azimuth ($\varphi$) and elevation ($\theta$) with respect to the center. These coordinates can reflect actual positions of objects in real space relative to the lidar.

A typical camera, on the other hand, has a lens system that projects a rectilinear image of the scene onto a flat rectangular sensor. Each frame 154 represents the collected pixels (picture elements) from that flat sensor. Each pixel can be represented in rectangular coordinates (x, y) based on the position of the pixel on the sensor. Due to the distortions inherent in the projection, these rectangular coordinates do not directly correspond to two-dimensions of a position in the real scene. Using the calibration factors 117 each voxel 152 can be mapped to a portion 156 of the rectangular frame 154, referred to herein as a patch. The sizes of each patch may vary, depending on the position of the voxel and how that relates to the camera frame. Each voxel can be identified by its particular coordinates ($\rho$, $\varphi$, $\theta$) and each patch can be identified by a list of pixels (x, y) or by ranges of pixel positions. The particular coordinate systems and mapping processes may be adapted to suit different implementations.

Figure 3:
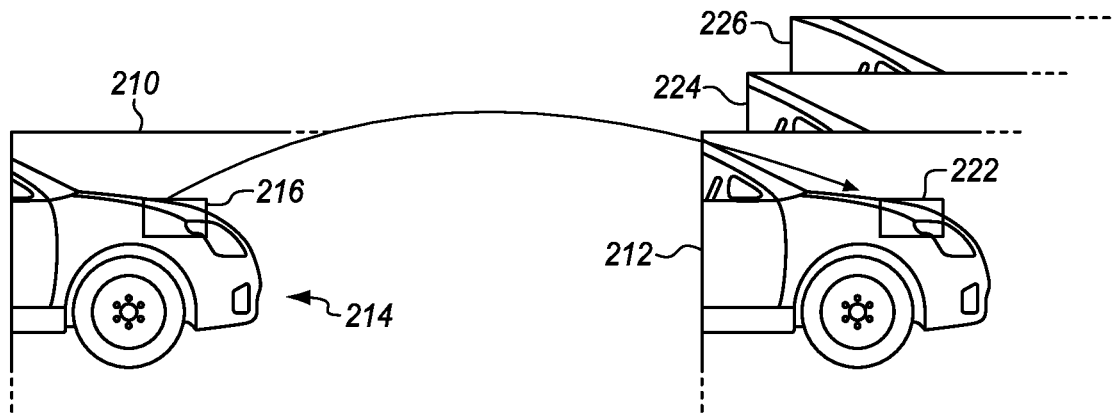
FIG. 3 is a diagram of an example of a first stage of mapping voxels to pixels.

FIG. 3 is a diagram of a first stage of mapping voxels to pixels. For illustration purposes, a portion of a lidar frame 210 is shown adjacent to a portion of a corresponding camera frame 212. The lidar frame has an object that might appear to be a vehicle 214 moving to the right through the frame. A voxel 216 is defined by the structure of the lidar and correlates roughly with a portion of the vehicle. The position of the voxel is mapped to a patch of pixels 222 in the camera frame. In some embodiments, the mapping is not related to the objects that appear in the frame but instead to the physical characteristics and operation of the lidar and the camera. As shown, the voxel and the patch are not tied to any particular part of the vehicle.

The lidar frame 210 is associated with three camera frames 212, 224, 226 each captured at a different time and typically in sequence. The three frames are shown to represent that, in some embodiments, the camera frame capture rate is three times the lidar frame capture rate. The particular ratio may vary for different implementations and it is not required that every camera frame be used. As shown, the vehicle 214 is moving to the right and so it has moved further to the right in the subsequent camera frames 224, 226. As shown, the lidar and the camera have captured the same image in their correlated frames, however, this is shown in this way for simplicity with the line drawings. An actual lidar will generate a frame that, if it were to be represented as a line drawing, does not look like a camera image.

In an actual application each voxel in a lidar frame is mapped to a patch in an approximately simultaneous camera frame. The patch is a set of possibly hundreds of pixels. In one example, the voxel is first mapped to a single pixel. The single pixel can be chosen based on camera calibration where a look-up table maps each voxel ($\theta$, $\varphi$) to a specific camera pixel (x, y) using external camera calibration and registration. The table could have different values based on range ($\varphi$ to account for optical effects so that the input is the entire voxel ($\rho$, $\theta$, $\varphi$) and the output is a pixel (x, y), where different range sometimes provides a different pixel (x, y). Alternatively, complex image understanding algorithms may be used, in which an object is identified in the lidar frame from multiple voxels and then mapped to a corresponding object identified from pixels in the camera image. One common way to identify an object is by its shape where edges are found. Another way is by its motion. A centroid of a shape at a voxel position can then be mapped to a centroid of the same shape as it is defined by pixels.

The correlation of the voxels and pixels may include a simple shift from a position in the 3D point cloud or the 3D model to a pixel position in a 2D image grid. As an example, each pixel may be shifted 2 pixels to the left and 12 pixels up. In this way, a correction or calibration factor also serves as a mapping function. The same type of mapping may also be used if there are multiple cameras to cover the field of regard of the lidar or multiple lidars to cover the field of regard of a single camera. Each camera or each lidar would have a different calibration and mapping set 117 the lidar point field map to camera patches. This mapping function may be a simple 2D position adjustment or there may be different adjustments for different positions in the field of regard so that there is a full matrix of functions for each pixel or a factor to be applied with distance from the center of the 2D camera image.

Figure 4:
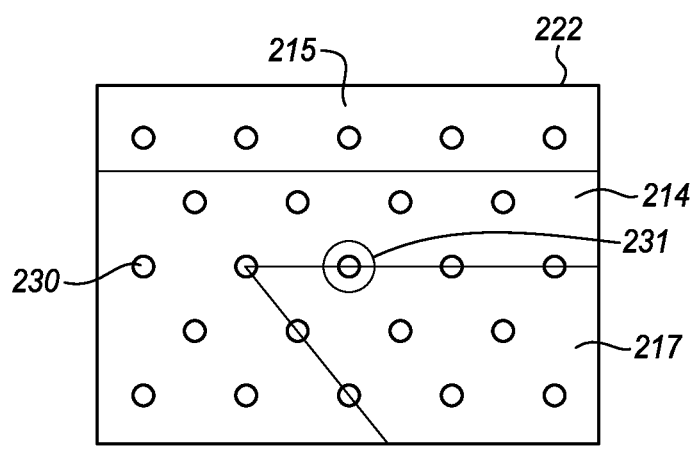
FIG. 4 is a diagram of an example patch of pixels surrounding a mapped pixel.

FIG. 4 is a diagram of the patch 222 of pixels 230 surrounding a mapped pixel of FIG. 3. Typically there are thousands of patches for each voxel frame. The mapping can be done in different ways. In this example, a central pixel 231 in the camera frame patch has been identified that corresponds to the position of the voxel in the lidar. The physical objects that correspond to this position in the point cloud are not used. In this patch, there is a portion of the vehicle 214, including a lamp housing 217, and unidentified background 215. The patch is shown as having 23 pixels 230, for illustration purposes, but typically there are hundreds or more pixels for each voxel. The pixels of the patch cover all of the scene that is near the voxel.

Having established a voxel to single pixel relationship, the higher resolution of the camera is used to establish the patch. In one example a fixed size bounding box of additional (nearest neighbor) pixels around the central pixel defines the size of the patch. As shown, there are two neighboring pixels in each direction from the central pixel 231. In an actual implementation there will be many more than two. This additional size defines the patch. If there is a fixed number of voxels and a fixed number of pixels, then there is a fixed number of pixels per voxel. If the lidar can change its scan rate or resolution, then the current scan rate and resolution can be added to adjust the number of pixels on a per frame or per region basis. As mentioned, more complex techniques may be used to better define the initial patch.

Figure 5:
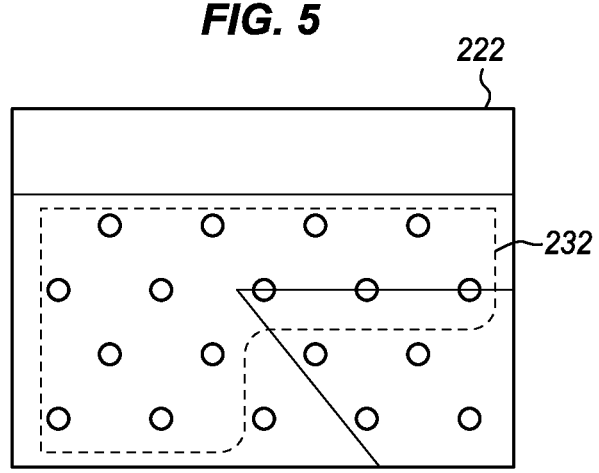
FIG. 5 is a diagram of an example adjusted patch of pixels.

In some implementations, the initial patch assignment is suitable for every purpose. In other implementations, the size and shape of the patch, i.e. the pixels to be included in the patch, may be adjusted or fine-tuned. FIG. 5 shows an adjustment of the patch to an adjusted patch 232 that excludes some of the pixels. In the example, the background 215 and lamp housing 217 have been excluded. This may be done based on color, reflectance, edges, or other criteria.

Ideally, each patch corresponds to a partial or single object that behaves the same way in terms of motion, e.g. the bumper of a car or the head of a pedestrian. One approach is to use common chroma or luminance edge detection algorithms to find shapes and to adjust the patch edges to correspond to the shape edges.

A joint probability calculation (JPC) may alternatively be used to combine multiple factors into the technique to determine whether each pixel belongs to a particular voxel. The JPC may determine whether a pixel is associated with a patch depending on a variety of factors, including range, color, color gradient, luminance, luminance gradient, and distance to the next-neighboring voxels. The JPC may be used with multiple color and luminance factors to find pixels in a region around the central pixel that are similar in color and luminance. These pixels are then assigned to the same patch. Another alternative would be to determine motion in the camera frames. Pixels with the same or a similar motion vector to the central pixel or to some area around the central pixel are then assigned to the same patch. In this example, the lamp housing 217 has the same motion as the fender to which it is attached and would be a part of the patch 232.

When fine-tuning the patch, some pixels between the central pixels or on the periphery of each patch, will not belong to a patch. These pixels will not be used in the central frame in which the pixel mapping is made. However, the corresponding pixels in adjacent camera frames may be used for motion vector purposes. When the patches are used to extract color and motion, each patch need not be defined perfectly. If there are multiple objects in a single patch, that can be fixed by fine tuning the patch or by more complex color and motion algorithms, or by increasing the local resolution of the lidar scanner.

Figure 6:
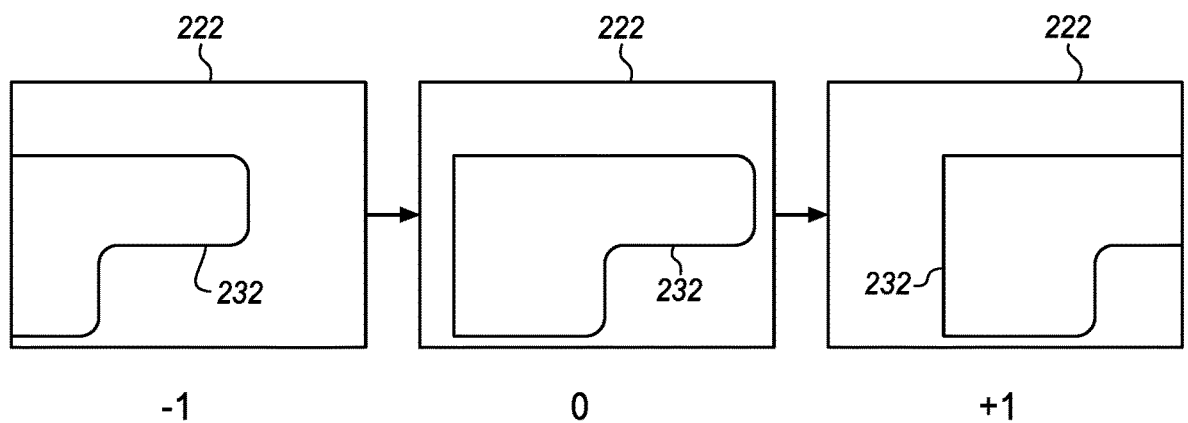
FIG. 6 is a diagram of multiple frames of an example patch moving across the frames.

FIG. 6 is a diagram of motion of the patch across adjacent frames. The central patch 222 is shown in a portion of a sequentially central frame to which the voxel has been mapped. The portion of the frame is indicated with a sequence number of "0." The adjusted patch 232 fills only a portion of the original patch. The additional frames of the camera can be used to determine the motion of the adjusted patch 232 between the camera frames. The adjacent frame at time "−1" shows the adjusted patch in a position to the left of the position of the patch at time "0." The portion of the frame at time "+1" shows the adjusted frame to the right of the position in the central patch. Using the multiple camera frames, the motion of the patch can be determined and rendered as a motion vector with direction of movement and speed of movement.

When the camera has a higher frame rate than the lidar, the higher frame rate can be used to determine more accurate motion with less latency than the lidar. In this example, the camera generates three frames for each lidar frame and all three frames can be used. The motion vector for each frame typically indicates how that point has moved from the previous frame. With three frames, there may be two motion vectors for the movement between adjacent frames or the two motion vectors may be combined by e.g. averaging. There are a variety of different ways to determine object motion across a frame sequence, including techniques that are used for some video compression technologies. Using the range ($\varphi$ information from the lidar, the speed of the patch across the frame can be converted to actual real world speed across the real scene. In this example, adjacent frames −1, 0, +1 are used, but the choice of frames may be adapted to suit different implementations. The motion vectors allow the data from multiple frames to be combined into a signal motion vector. As a result, the pixel information from the adjacent frames can be discarded. This reduces the total information that is transferred to the perception engine. In embodiments, the motion vectors are compensated for movement of the vehicle and the lidar through the scene.

With a simpler patch determination, e.g. one without adjusting patches, the motion vector determination may be used to exclude pixels that are not part of the patch. Object boundary determination may also be used in the motion vector determination. In one example, motion vectors can be determined for all of the pixels in the patch and then the patch can be adjusted by excluding those that differ from the central pixel by more than a threshold.

In a typical scene, most voxels will correspond to only a part of an object and many voxels will include parts of multiple objects. The voxels and the data from the patches for the voxels will be combined in the perception engine to build the complete object. There will be some patches that don't correspond to any particular object. Either there are small parts of multiple objects with disparate behavior or there is a part of an object with no discernible features such as road, water or sky. These patches will not have any discernible motion and the perception engine can assess the meaning and use of those voxels.

Another optional operation in the fusion processor is to downscale the data for each patch based on range ($\rho$). In many implementations, the camera captures sufficient resolution to enable classification of objects at the maximum range of the system. Closer objects are therefore captured at higher than the required resolution and may therefore be downscaled without impacting classification performance. Each patch of pixel color values is scaled inversely proportionally to the range to reduce the data without sacrificing classification performance.

The scaling may be done in any of a variety of different ways. As a starting point, there are hundreds of pixels in a patch and therefore associated with each pixel. The pixels may be pre-processed so that each has a red, green, and blue component or a luminance and chrominance component, or the pixels may be provided in a Bayer or other type of pattern. There is also pixel data for three frames of data. In some embodiments, the pixels of the adjacent frames are discarded. This information can be encoded as motion information in the motion vectors as described above. To further downscale the image data for some patches, the pixels in each patch are low-pass filtered for anti-aliasing and then decimated. There are a variety of different decimation techniques. As examples, every other pixel, every two other pixels, every three other or more pixels may be discarded. Other data reduction techniques may be used instead or in addition.

Figure 7:
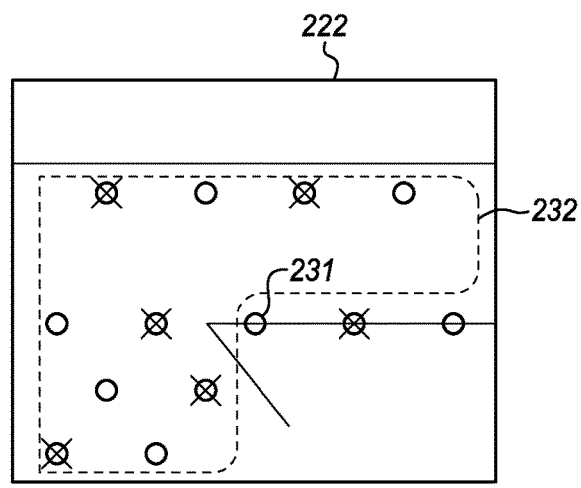
FIG. 7 is a diagram of an example patch after downscaling the pixels.

FIG. 7 is a diagram of the adjusted patch of FIG. 5 showing an example of downscaling in which the number of pixels is reduced in half. In this example, the central pixel 231 of the adjusted patch 232 is kept but every other pixel in each row is discarded as indicated by crossing out those pixels. Similar techniques may be used to downscale the pixel data by different amounts.

After downscaling, the total amount of scene data from the camera has been reduced. In some embodiments all of the lidar data is preserved. Accordingly, rectification requires less computation than before the pixel decimation. In general, the scaled RGB image may be rectified at the voxel resolution and frame rate. Rectification in some embodiments includes correcting for non-linear aspects of the optics in the camera.

With the camera data correlated, downscaled, and rectified, it is ready to be combined with the voxel data. Motion vectors can be added to the voxel annotated point cloud as well. Augmented voxels are generated for the perception engine. The augmentation adds camera data to each voxel. A standard voxel has at least a three dimensional position ($\rho$, $\theta$, $\varphi$). The camera can add color and motion. This is used to augment the voxel as a result of this early fusion. The voxel is then sent to the perception engine at the lidar resolution and frame rate. The processing load at the perception engine is greater than for the lidar alone but far less than for a camera alone.

The total voxel data for most or many of the voxels may include: range, azimuth, elevation, a patch of RGB values, motion vector 1 (change in azimuth, elevation, and range based on comparing with the previous adjacent camera frame), and motion vector 2 (change in azimuth, elevation, and range based on comparing with the subsequent adjacent camera frame). Additional data may be added using additional pre-processing and additional sensors.

Using current sensors, a lidar, as described in more detail below, operates with a scanning beam. The returns to the image sensor are, accordingly, received in scan lines. The return from the top scan line is generally received before the return from the lower scan lines. These lines are collected together to build the lidar frame described herein. Similarly a current camera sensor is read in a "rolling shutter" mode where the light incident on the photodetectors of the sensor is captured in sequence one row at a time. These lines are similarly sent to the pre-processing module which builds the lines into the frames that are used for fusion, classification etc.

As a consequence of this scan line and rolling shutter operation each scan line and each photodetector row has a different time associated with it. When the lidar and the camera have different numbers of lines and run at different frame rates, then the timing of any one particular voxel will not normally accurately align with the timing of the corresponding pixel row in any one particular camera frame. Even if the lidar and camera are synchronized, it is still very difficult to ensure that there is an appropriate patch that is synchronized with each voxel. Since each patch has many camera rows, each with different timing, this becomes still more difficult.

The rolling shutter frame rate of the camera could be adjusted to match each scan line of the lidar; however, this would degrade the performance of the camera. The high frame rate motion tracking would be lost. Alternatively, the camera frame selection can be approximately matched to the lidar scan rate.

In the example of the camera frame rate being three times the lidar frame rate, the camera captures three rolling shutter frames in the time that it takes the lidar to perform a single frame scan. The first camera frame capture can be synchronized with the start of the lidar scan. The third camera frame capture will then be completed at about the time of the end of the lidar scan. In order to obtain more accurate motion and color, different camera frames may be used for different portions of the lidar frame. The top third of the lidar frame is mapped into camera frame N. The middle third or middle of the lidar frame is mapped into the next camera frame N+1 and the bottom third of the lidar frame is mapped into the next camera frame N+2. In this example, the references to top and bottom may be reversed, depending on the operation of the lidar and the number of frames may be adjusted depending on the relative frame rates of the lidar and the camera.

For even greater timing accuracy, the pixel values and the pixel positions in a patch may also be adjusted based on the timing. Even when different portions of the lidar frame are assigned to different camera frames, some of the voxels will be assigned to a frame that is before the voxel in time and others of the voxels will be assigned to a frame that is after the voxel in time. As mentioned, the scan line sweeps across the scene so that voxels on one side of the scan line are received before voxels at the other end of the scan line. Voxels of earlier scan lines are received before voxels of later scan lines.

As described above, motion vectors can be determined by comparing pixel values of the selected mapped frame to the pixel values of earlier and later frames. These pixel values include the full color information in order to identify the patch and its position in other frames. This motion vector information for the RGB camera patches can be projected to account for temporal differences between when the RGB data was captured and when the lidar line or voxel was scanned. This will eliminate the temporal differences between the RGB and lidar data bringing them into closer timing alignment. This may be particularly important with fast moving objects. The projection may be made proportional to the temporal difference. Accordingly, the RGB values delivered to the perception engine are not the RGB values of a particular frame, but will be scaled and translated based on the motion vector and temporal difference in when the lidar and camera lines were collected.

Figure 8:
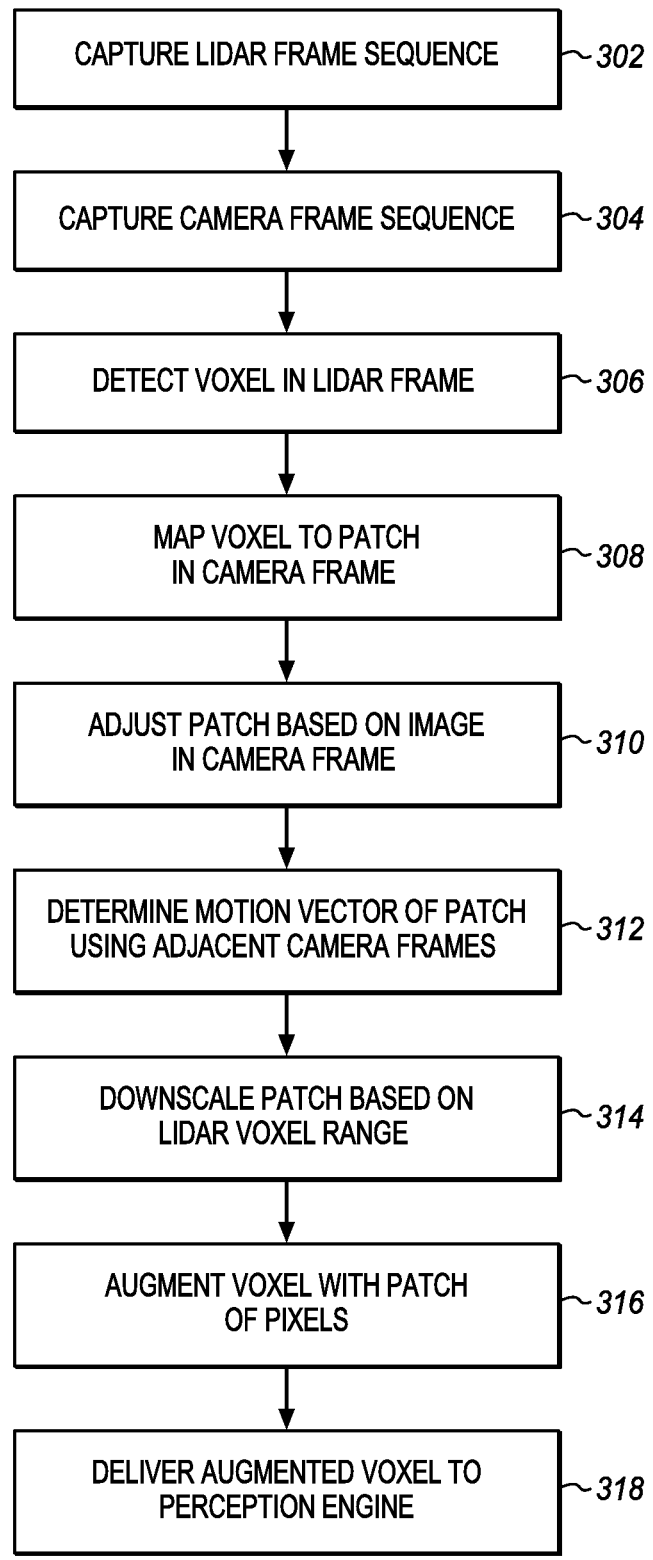
FIG. 8 is a process flow diagram of an example early fusion of lidar and camera data.

FIG. 8 is a process flow diagram of early fusion of lidar and camera system data. The process is a repeating process for each voxel of each lidar frame. At 302, the lidar captures a sequence of lidar frames. These frames may be in the form of a sequence of voxels or in the form of a point cloud. Each lidar frame is associated with a particular time and, in some cases, due to the scanning nature of some lidar systems, each voxel may be associated with a particular time.

The sensor system also has one or more supporting cameras and at 304 the camera captures an image frame sequence. These frames may be in a two dimensional grid of pixels or in any other configuration. The pixels represent brightness and color and there are a variety of different ways to represent these values, depending on the configuration of the image sensor and depending on the processing that is applied. In some sensors, the photodetectors are in a Bayer pattern of red green and blue (RGB) photodetectors and the sensor has a processor to convert the Bayer pattern into RGB values for each pixel. The described techniques may be applied to any particular configuration and data configuration that may be represented by the pixels.

At 306 a voxel of a lidar frame is detected. The voxel has a 3D position which may be indicated by any type of coordinates. Typically these are range, azimuth, and elevation, however, these values may be mapped into other coordinate systems, including horizontal, vertical, and depth (x, y, z). The selected voxel is mapped to a patch in a camera frame at 308. Each voxel is associated with a particular time stamp of a particular frame and this time stamp may be applied to select a camera frame that is stamped with the closest time to the time of the lidar frame. If the camera frame capture rate is faster than the lidar frame capture rate, then a camera frame can be selected that is at almost the same time.

In some embodiments, the voxel is mapped to a particular single pixel in a simultaneous camera frame. The patch is then selected by expanding the single pixel selection out through selecting additional pixels that are its nearest neighbors. When the camera frame has millions of pixels and the lidar frame has thousands of voxels, then the patch will expand to hundreds or thousands of nearest neighbor pixels. In some embodiments, each pixel has an associated bounding box having a predetermined number of adjacent pixels. After the central pixel is selected then the patch is defined as the pixels within the associated bounding box. In some embodiments, some manner of shape, edge, or object detection is applied to the selected camera frame and the patches are assigned based on the detected shapes, edges or objects so that the patch contains only or mostly one object.

Having assigned a patch, the contours of the patch can be adjusted or fine-tuned based on characteristics of the image at 310. This may be done using shape, edge or object detection, as mentioned above, after a bounding box has been defined. The patch may be restricted to stop at edges or other characteristics in the image. Alternatively, motion may be assigned to various pixels and the bounding box may be limited to pixels having the same or a similar motion vector. The adjustment of the bounding box provides two benefits. First, it reduces the number of pixels in a patch. This reduces the total amount of data in the augmented voxel. Second, it limits the patch to objects that correspond to the voxel. For any one voxel, there may be reflective objects, detected by the lidar, such as a vehicle, and other objects that the lidar cannot detect, such as sky. By adjusting the patch, the pixel data may be restricted to the vehicle part and exclude the sky part. This will provide more useful information to the perception engine.

Having determined the patches, motion vectors may be determined for each patch at 312. For each patch, the positions of the pixels in one frame are compared to the positions of the pixels in another later or earlier frame. The difference between the positions may be used to determine the direction and speed of the pixels and therefore the patch across the frame. Using distance or range of the real object in the scene corresponding to the patch, the actual motion of the real object can be estimated. The distance can be determined using the range of the corresponding lidar voxel.

In the described examples, there are three camera frames for each lidar frame. This allows for two motion vectors for each patch. The first motion vector (MV1) is based on the central frame and the previous frame. The second motion vector (MV2) is based on the central frame and the subsequent frame. These two motion vectors can be combined to form a single frame. In other configurations there may be more or fewer than three frames per lidar frame and the determination of motion vectors may be adapted accordingly.

At 314, the patch data is downscaled for each voxel. The camera produces hundreds of pixels and multiple frames for each voxel. For some objects, all of this data may be useful for the perception engine, but for most objects much less data is required. An object classifier in the perception engine will require a certain number of pixels, e.g. 10-50, in order to identify an object with sufficient accuracy. A faraway object will be smaller than a close object and therefore it will be covered by fewer pixels from the same fixed focal length camera. Accordingly, the system may keep all of the pixels for a faraway object and for smaller objects even that may not be enough. On the other hand a closer object may fill a significant part of the camera field of view and be covered by thousands of pixels, when hundreds of pixels are enough.

Since the lidar voxel has a range, an inverse proportionality can be determined so that the pixels for closer voxels are downscaled and the pixels for farther voxels are not downscaled or are downscaled less. For this, the range (e.g. $\rho$) can be taken for each voxel and applied to the patch size using an inverse proportionality function. The amount of downscaling as determined by the inverse proportionality can then be applied to the patch using decimation, nearest neighbor, or other techniques.

At 316 each voxel is augmented with the additional data from the camera. This data can include motion, color and other information. The additional data for multiple voxels is combined together to create an augmented point cloud for the frame. This data with the early fusion is then delivered at 318 to the perception engine. Because the camera data has already been analyzed and downscaled, there is far less data and that data is delivered at a lower rate, e.g. the rate of the lidar. The data therefore requires less data transmission capability and less computation capability. In addition, the camera data has already been linked to the lidar data further reducing the computational burden on the perception engine. This data may be used by the perception engine to supply a variety of purposes including navigation, observation, and reconnaissance.

Figure 9:
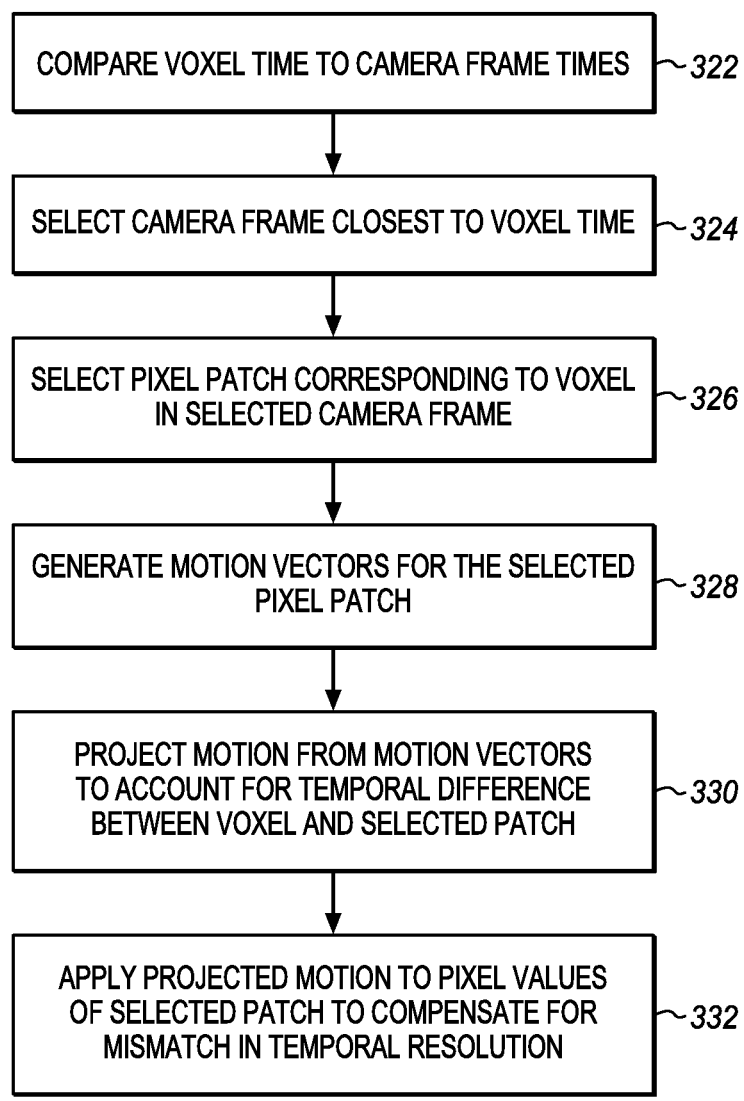
FIG. 9 is a process flow diagram of an example patch adjustment using motion vectors and temporal factors.

FIG. 9 is a process flow diagram of integrating temporal factors further in mapping the voxel and adjusting the patch. The process starts after detecting the voxel at 306 with comparing the voxel time to camera frame times at 322. The voxel time will correspond to the time of the corresponding lidar scan line. The camera frame time will correspond to the time of the camera frame capture. A single time may be used for the entire camera frame or a different time may be used for each row or group of rows of the camera's rolling shutter. At 324 the comparison is used to select a camera frame or a portion of a camera frame that is closest in time to the voxel time. The voxel is then mapped at 308 to a patch in the selected camera frame.

At 326 a pixel patch is selected in the selected camera frame that corresponds to the voxel. The pixels of the patch may then be adjusted as at 310, depending on the implementation. At 328 motion vectors are determined for the patch as at 312. At 330 the motion vectors are used to project motion onto the selected patch to account for the temporal difference between the voxel and the selected camera frame patch. At 332 the projected motion is applied to the pixel values of the selected patch. This is to compensate the pixel RGB data for the mismatch in temporal resolution. Accordingly, if the selected frame is earlier than the voxel, then the motion vectors can be used to determine an intermediate timing and position of the pixels after the selected frame. The pixel values can then be adjusted using the motion vectors to a projected value that is from a time later than the selected frame and before the next frame.

The camera system and the lidar system can be configured to be independent and even redundant so that in the event of a camera failure, the system performance would degrade to the current state of the art for lidar alone. In the event of a lidar failure, a state of the art visible light camera system can be used. This provides independence for the two systems and an associated redundancy.

The described system takes advantage of the high quality color image detail from a visible light camera that may already be onboard for other purposes. The higher resolution and higher frame rate camera sensors require far more compute power to process the far larger amount of camera data. This has a corresponding increase in cost and power consumption. By combining color data from a camera with the data reduction of motion vectors and downscaling, a significant reduction in compute is possible. This comes with no significant loss in useful information from the camera.

Self-driving or "autonomous" vehicles generally employ sensors, such as light detection and ranging (lidar) devices, to detect or "see" the surrounding environment as the vehicles move toward their destinations. Such vehicles include self-driving control systems that process the sensor data and, based on both the sensed environment and the desired destination, determine which maneuvers and operational states (e.g., speed, braking force, steering direction) are most appropriate on a more or less continuous basis throughout the trip. The principles and systems described herein may be applied to self-driving or autonomous vehicles among other uses. The systems described below show additional details of the systems above including more detail for some of the systems and alternatives to some of the systems above. The features of these systems may be combined in various ways to suit particular applications.

Figure 10:
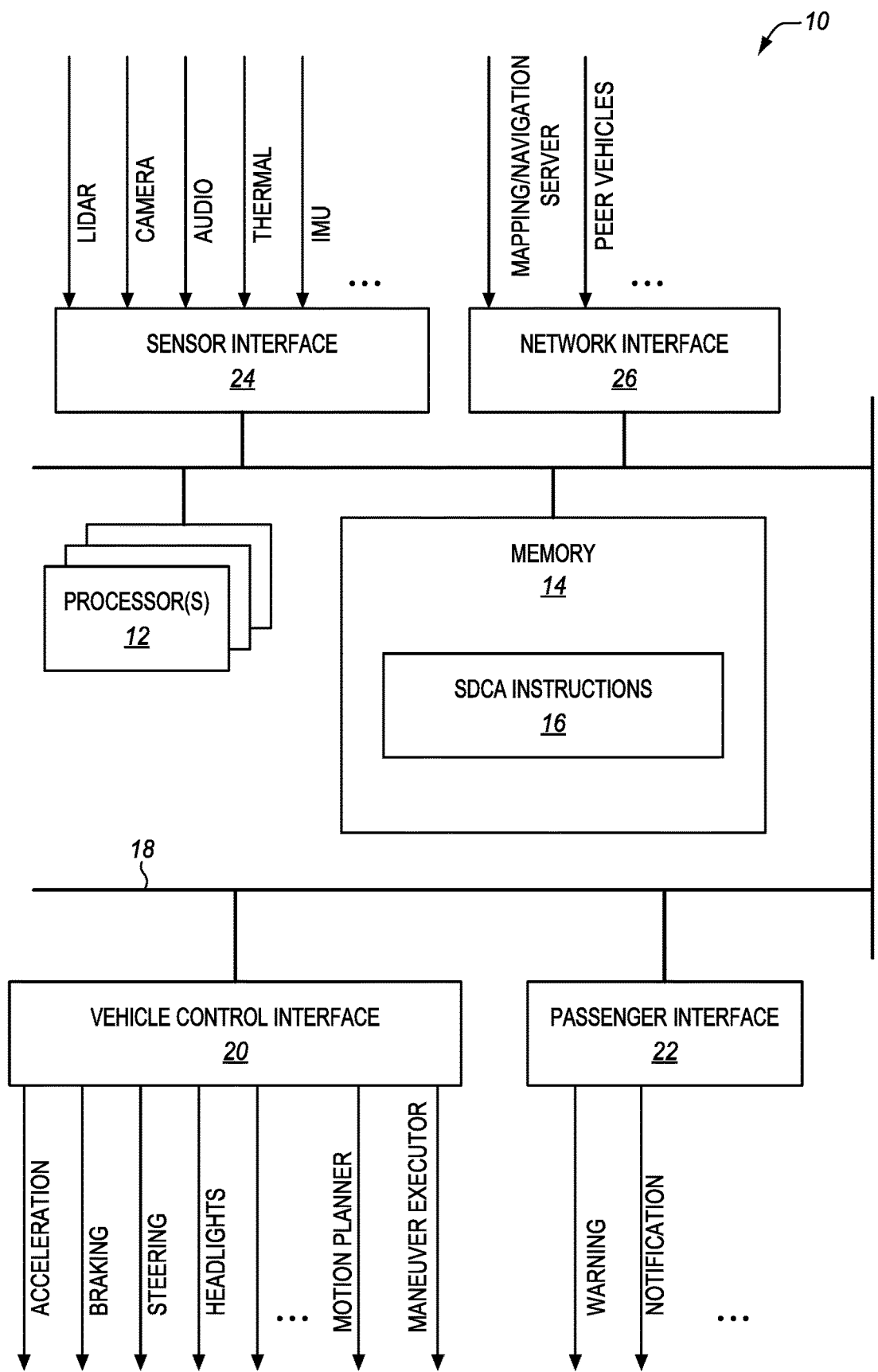
FIG. 10 is block diagram of an example computing system for controlling and/or operating an autonomous vehicle.

FIG. 10 includes a block diagram of an example computing system 10 for controlling and/operating an autonomous vehicle. The computing system 10 may be integrated within an autonomous vehicle in any suitable manner, and at any suitable location or locations within the vehicle. For example, the computing system 10 may be included, or partially included, within a vehicle controller that is on-board an autonomous vehicle, where the vehicle controller controls and/or operates at least some of the vehicle's driving subsystems that include mechanical components (e.g., accelerator, brakes, steering mechanism, lights, etc.) in a fully- or semi-autonomous manner. The computing system 10 includes one or more processors 12 and one or more tangible, non-transitory memories 14 storing thereon vehicle subsystem control and/or operation instructions 16, which are referred to herein as self-driving control architecture ("SDCA") instructions 16. Generally speaking, the SDCA instructions 16 generate decisions for controlling various operations, behaviors, and maneuvers of the autonomous vehicle.

In embodiments where the processor(s) 12 include more than a single processor, each processor may be a different programmable microprocessor that executes software instructions stored in the memory 14. Alternatively, each of the processor(s) 12 may be a different set of such microprocessors, or a set that includes one or more microprocessors and one or more other processor types (e.g., ASICs, FPGAs, etc.) for certain functions.

The memory 14 may include one or more physical memory devices with non-volatile memory. Any suitable memory type or types may be used, such as ROM, solid-state drives (SSDs), hard disk drives (HDDs), and so on. The processor(s) 12 are coupled to the memory 14 via a bus or other network 18. The network 18 may be a single wired network or may include any suitable number of wired and/or wireless networks. For example, the network 18 may be or include a controller area network (CAN) bus, a Local Interconnect Network (LIN) bus, and so on.

Also coupled to the network 18 are a vehicle control interface 20, a passenger interface 22, a sensor interface 24, and a network interface 26. Each of the interfaces 20, 22, 24 and 26 may include one or more processors (e.g., ASICs, FPGAs, microprocessors, etc.) and/or other hardware, firmware and/or software to enable communication with systems, subsystems, devices, etc., that are external to the computing system 10.

The vehicle control interface 20 is generally configured to provide control data generated by the processor(s) 12 executing the SDCA instructions 16 to the appropriate operational subsystems of the autonomous vehicle, such that the appropriate subsystems can effectuate driving decisions made by the processor(s) 12. For example, the vehicle control interface 20 may provide control signals to the appropriate driving-related subsystem(s) that include mechanical components, e.g., accelerator, brakes, steering mechanism, lights, etc. As another example, the vehicle control interface 20 may output signals to appropriate subsystem(s) that plan the motion of the vehicle (e.g., a motion planner), and/or that control the execution of driving maneuvers (e.g., a maneuver executor). In some embodiments, the vehicle control interface 20 includes separate interface hardware, firmware and/or software for different operational subsystems.

The passenger interface 22 is generally configured to provide alerts, warnings, notifications, and/or other information to one or more passengers of the autonomous vehicle. In some embodiments where the vehicle is not fully autonomous (e.g., allowing human driving in certain modes and/or situations), the interface 22 may specifically provide such information to the driver (e.g., via dashboard indicators, etc.). As just one example, the passenger interface 22 may cause a display and/or speaker in the vehicle to generate an alert when the processor(s) 12 (executing the SDCA instructions 16) determine that a collision with another object is likely. As another example, the passenger interface 22 may cause a display in the vehicle to show an estimated time of arrival (ETA) to passengers. In some embodiments, the passenger interface 22 also permits certain user inputs. If the vehicle supports passenger selection of specific driving styles, for example, the passenger interface 22 may cause a display to present a virtual control (e.g., button) that a passenger may activate (e.g., touch, scroll through, etc.) to select a particular driving style.

The sensor interface 24 is generally configured to convert raw sensor data obtained by one or more sensor devices (e.g., lidar, camera, microphones, thermal imaging units, IMUs, etc.) to a format that is consistent with a protocol of the network 18 and that is recognized by one or more of the processor(s) 12. The sensor interface 24 may be coupled to an on-board lidar system and/or other type of active sensing system, for example, with the sensor interface 24 converting point cloud data generated by such system(s) into an appropriate format. In some embodiments, the sensor interface 24 includes separate interface hardware, firmware and/or software for each sensor device and/or each sensor type.

The network interface 26 is generally configured to convert data received from one or more devices or systems external to the autonomous vehicle to a format that is consistent with a protocol of the network 18 and is recognized by one or more of the processor(s) 12. In some embodiments, the network interface 26 includes separate interface hardware, firmware and/or software for different external sources. For example, a remote mapping/navigation server may send mapping and navigation/route data (e.g., mapping and navigation signals) to the computing system 10 via a first type of wireless network interface included in the network interface 26, e.g., a cellular network interface, while one or more peer vehicles (e.g., other autonomous vehicles) may send data (e.g., current positions of the other vehicles)

to the computing system 10 via a different type of wireless network interface included in the network interface 26, e.g., a Wi Fi network interface. Other types of external data may also, or instead, be received via the network interface 26. For example, the computing system 10 may use the network interface 26 to receive data representing rules or regulations (e.g., speed limits), object positions (e.g., road rails, overhanging signage, etc.), and/or other information from various infrastructure devices or systems.

In some embodiments, no sensor data (or only limited sensor data) of the autonomous vehicle is received via the sensor interface 24. Instead, the processor(s) 12 executes the SDCA instructions 16 using, as input, only (or primarily) data that is received by the network interface 26 from other vehicles, infrastructure, and/or other external devices/systems. In such an embodiment, the external data may include raw sensor data that is indicative of the vehicle environment (but was generated off-board the vehicle), and/or may include higher-level information that was generated externally using raw sensor data (e.g., occupancy grids).

Although not illustrated in FIG. 10, the network 18 may also couple to other types of interfaces and/or components. Additionally, in some embodiments, one or more of the interfaces shown in FIG. 10 may be omitted (e.g., the sensor interface 14, as discussed above). Moreover, it is understood that the computing system 10 represents just one possible configuration for supporting the software architectures, functions, features, etc., described herein, and that others are also within the scope of this disclosure.

Figure 11:
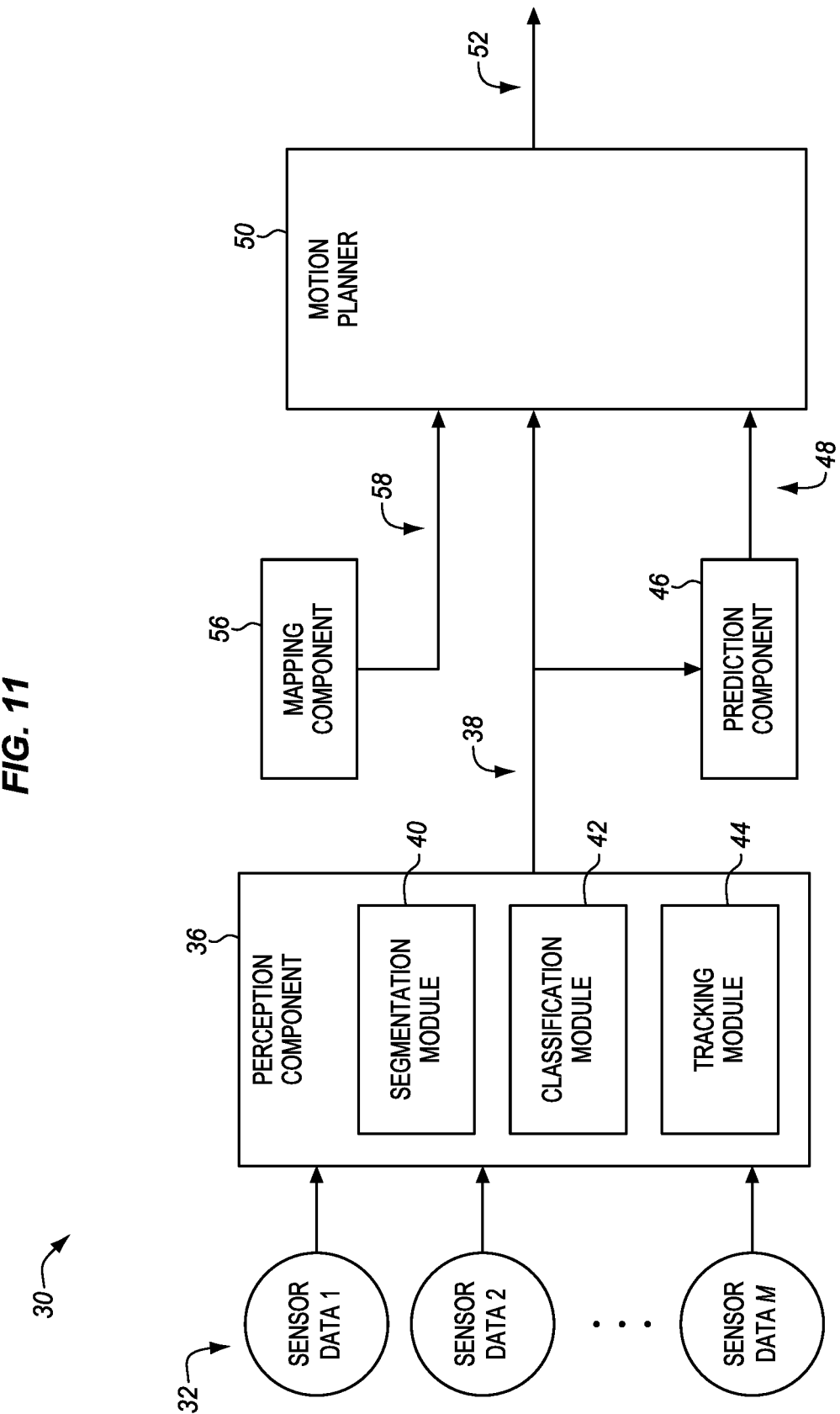
FIG. 11 is a block diagram of an example self-driving control architecture (SDCA) of an autonomous vehicle.

FIG. 11 illustrates an example self-driving control architecture (SDCA) 30 of an autonomous vehicle. Generally speaking, a SDCA 30 may generate instructions for controlling various operations and maneuvers of an autonomous vehicle. The SDCA 30 may be implemented by the SDCA instructions 16 of FIG. 10, in an embodiment. The SDCA 30 receives as input M sets of sensor data 32 generated by M different sensors, with M being any suitable integer equal to or greater than one. The sensor data 32 may be received via the sensor interface 24 of FIG. 10, in an embodiment. As just one example, "sensor data 1" may include frames of point cloud data generated by a first lidar device, "sensor data 2" may include frames of point cloud data generated by a second lidar device, "sensor data 3" (not shown in FIG. 11) may include frames of digital images generated by a camera, and so on. As discussed above with respect to FIG. 10, the sensors may include one or more lidar devices, cameras, radar devices, thermal imaging units, IMUs, and/or other sensor types. Generally speaking, the SDCA 30 is configured to process point cloud data and, in some embodiments, is also configured to process two-dimensional image data, such as camera data.

The sensor data 32 is input to a perception component 36 of the SDCA 30, and is processed by the perception component 36 to generate perception signals 38 descriptive of a current state of the environment in which the autonomous vehicle is located. It is understood that the term "current" may actually refer to a very short time prior to the generation of any given perception signals 38, e.g., due to the short processing delay introduced by the perception component 36 and other factors. To generate the perception signals, the perception component may include a segmentation module 40, a classification module 42, and a tracking module 44.

The segmentation module 40 is generally configured to identify distinct objects within the sensor data representing the sensed environment. Depending on the embodiment and/or scenario, the segmentation task may be performed separately for each of a number of different types of sensor data, or may be performed jointly on a fusion of multiple types of sensor data. In some embodiments where lidar devices are used, the segmentation module 40 analyzes frames that include point cloud datasets therein to identify subsets of points within each frame that correspond to probable physical objects located in the environment. In other embodiments, the segmentation module 40 jointly analyzes lidar point cloud data frames in conjunction with camera image frames to identify objects that are located in the environment. Other suitable techniques, and/or data from other suitable sensor types, may also be used to identify objects. It is noted that, as used herein, references to different or distinct "objects" may encompass physical things that are entirely disconnected (e.g., with two vehicles being two different "objects," and the road on which the vehicles are traveling as yet a different "object"), as well as physical things that are connected or partially connected (e.g., with a vehicle being a first "object" and the vehicle's hitched trailer being a second "object"). The segmentation module 40 may use predetermined rules or algorithms to identify objects. For example, the segmentation module 40 may identify as distinct objects, within a point cloud, any clusters of points that meet certain criteria (e.g., having no more than a certain maximum distance between the points in the cluster, or having the same relative velocity). As another example, the segmentation module 40 may utilize one or more neural networks that have been trained to identify distinct objects within the environment (e.g., using supervised learning with generated labels for different objects within test data point clouds, etc.), or may utilize one or more other types of machine-learning based models that have been trained, by using test or training data, to discern, distinguish, and/or identify probably distinct objects within a source image.

The classification module 42 is generally configured to determine classes (labels, categories, etc.) for different objects that have been identified or distinguished by the segmentation module 40. Like the segmentation module 40, the classification module 42 may perform classification separately for different sets of the sensor data 32, or may classify objects based on data from multiple sensors, etc. Moreover, and also similar to the segmentation module 40, the classification module 42 may utilize one or more neural networks or other machine-learning based models to classify objects, where the neural networks and/or machine-learning models have been trained, by using a set of test or training data, to perform object classification.

The tracking module 44 is generally configured to track distinct objects over time (e.g., across multiple lidar point cloud or camera image frames). The tracked objects are generally objects that have been identified by the segmentation module 40, but may or may not be objects that were classified by the classification module 42, depending on the embodiment and/or scenario. The segmentation module 40 may assign identifiers to identified objects, and the tracking module 44 may associate existing identifiers with specific objects where appropriate (e.g., for lidar data, by associating the same identifier with different clusters of points, at different locations, in successive point cloud frames). Like the segmentation module 40 and the classification module 42, the tracking module 44 may perform separate object tracking based on different sets of the sensor data 32, or may track objects based on data from multiple sensors. Moreover, and also similar to the segmentation module 40 and the classification module 42, the tracking module 44 may utilize one or more neural networks or other machine-learning models to track objects, where the neural networks and/or machine-learning models have been trained, by using a set of test or training data, to perform object tracking across frames and/or images.

The SDCA 30 also includes a prediction component 46, which processes the perception signals 38 to generate prediction signals 48 descriptive of one or more predicted future states of the autonomous vehicle's environment. For a given object, for example, the prediction component 46 may analyze the type/class of the object (as determined by the classification module 42) along with the recent tracked movement of the object (as determined by the tracking module 44) to predict one or more future positions of the object. As a relatively simple example, the prediction component 46 may assume that any moving objects will continue to travel on their current direction and with their current speed, possibly taking into account first- or higher-order derivatives to better track objects that have continuously changing directions, objects that are accelerating, and so on. In some embodiments, the prediction component 46 also predicts movement of objects based on more complex behaviors. For example, the prediction component 46 may assume that an object that has been classified as another vehicle will follow rules of the road (e.g., stop when approaching a red light), and will react in a certain way to other dynamic objects (e.g., attempt to maintain some safe distance from other vehicles). The prediction component 46 may inherently account for such behaviors by utilizing a neural network or other machine learning model, for example. The prediction component 46 may be omitted from the SDCA 30, in some embodiments.

In some embodiments, the perception signals 38 include data representing "occupancy grids" (e.g., one grid per T milliseconds), with each occupancy grid indicating object positions (and possibly object boundaries, orientations, etc.) within an overhead view of the autonomous vehicle's environment. Within the occupancy grid, each "cell" (e.g., pixel) may be associated with a particular class as determined by the classification module 42, possibly with an "unknown" class for certain pixels that were not successfully classified. Similarly, the prediction signals 48 may include, for each such grid generated by the perception component 36, one or more "future occupancy grids" that indicate predicted object positions, boundaries and/or orientations at one or more future times (e.g., 1, 2 and 5 seconds ahead).

A mapping component 56 obtains map data (e.g., a digital map including the area currently being traversed by the autonomous vehicle) and/or navigation data (e.g., data indicating a route for the autonomous vehicle to reach the destination, such as turn-by-turn instructions), and outputs the data (possibly in a converted format) as mapping and navigation signals 58. In some embodiments, the mapping and navigation signals 58 include other map- or location-related information, such as speed limits, traffic indicators, and so on. The signals 58 may be obtained from a remote server (e.g., via a cellular or other communication network of the autonomous vehicle, or of a smartphone coupled to the autonomous vehicle, etc.), and/or may be locally stored in a persistent memory of the autonomous vehicle.

A motion planner 50 processes the perception signals 38, the prediction signals 48, and the mapping and navigation signals 58 to generate decisions 52 regarding the next movements of the autonomous vehicle. Depending on the type of the motion planner 50, the decisions 52 may include operational parameters (e.g., braking, speed and steering parameters) and/or particular maneuvers (e.g., turn left, move to right lane, move onto shoulder of road, etc.). The decisions 52 may be provided to one or more operational subsystems of the autonomous vehicle (e.g., if the decisions 52 indicate specific operational parameters for subsystems that include mechanical components, such as steering mechanisms, accelerator, brakes, lights, etc.), or may be provided to one or more intermediate stages that convert the decisions 52 into operational parameters (e.g., if the decisions indicate specific maneuvers to be performed by a maneuver executor).

The motion planner 50 may utilize any suitable type(s) of rules, algorithms, heuristic models, machine learning models, or other suitable techniques to make driving decisions based on the perception signals 38, prediction signals 48, and mapping and navigation signals 58. For example, the motion planner 50 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In some embodiments, the motion planner 50 includes multiple, different motion planner types in order to provide a more diverse set of mechanisms for generating driving decisions, and thereby improve safety and/or other performance aspects of the autonomous vehicle.

Light detection and ranging (lidar) is a technology that can be used to measure distances to remote targets. Typically, a lidar system includes a light source and an optical receiver. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

FIG. 9 illustrates an example light detection and ranging (lidar) system 60. In particular embodiments, a lidar system 60 may include a light source 61, mirror 65, scanner 62, receiver 71, or controller 72. The light source 61 may include, for example, a laser which emits light having a particular operating wavelength in the infrared, visible, or ultraviolet portions of the electromagnetic spectrum. The light source 61 emits an output beam of light 66 which may be continuous wave (CW), pulsed, or modulated in any suitable manner for a given application. The output beam of light 66 is directed downrange toward a remote target 67.

Figure 12:
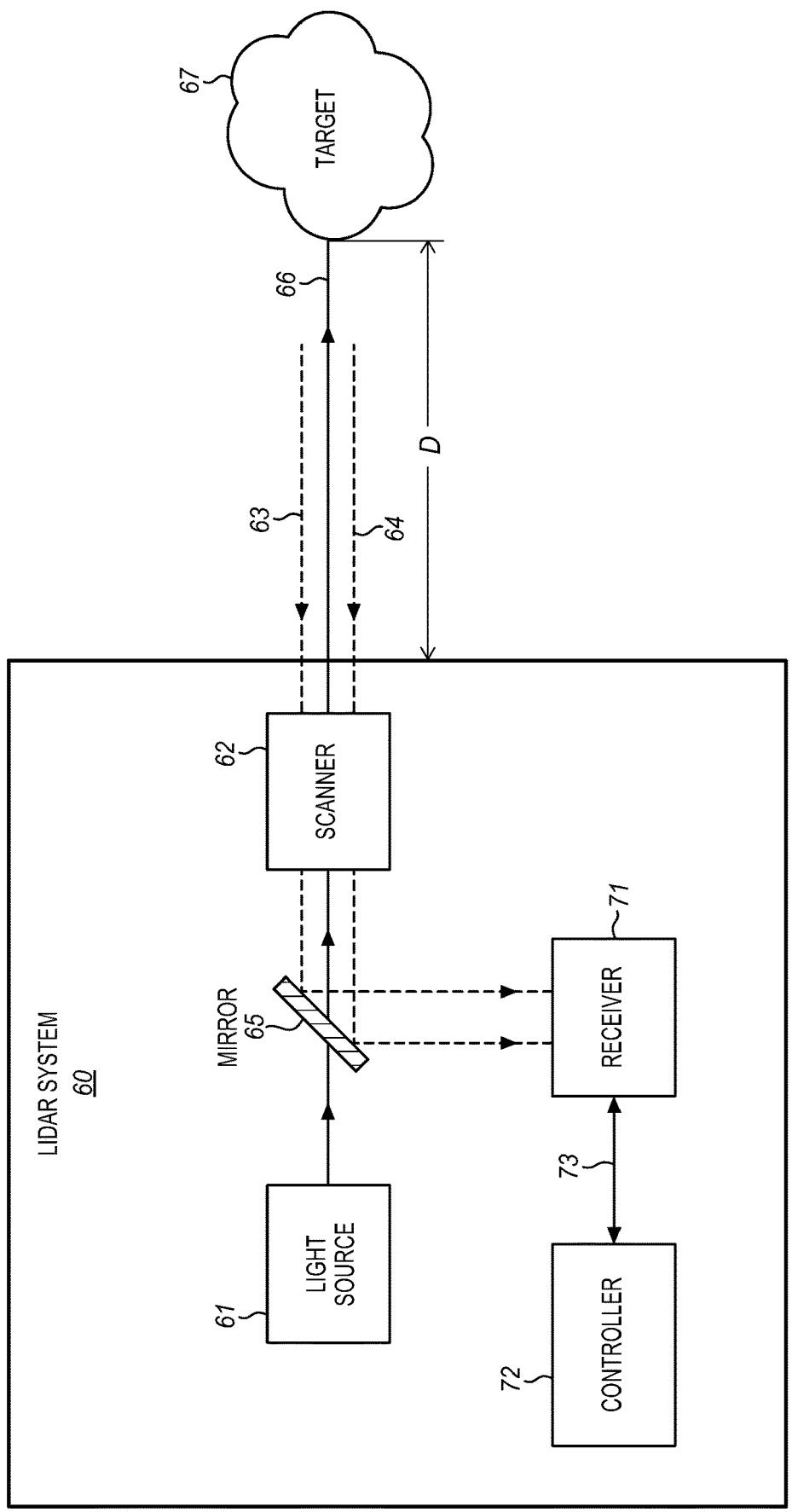
FIG. 12 is a block diagram of an example light detection and ranging (lidar) system.

Once the output beam 66 reaches the downrange target 67, the target may scatter or reflect at least a portion of light from the output beam 66, and some of the scattered or reflected light may return toward the lidar system 60. In the example of FIG. 12, the scattered or reflected light is represented by input beam 63, 64 which passes through scanner 62 and is reflected by mirror 65 and directed to receiver 71. In particular embodiments, a relatively small fraction of the light from output beam 66 may return to the lidar system 60 as input beam 63, 64.

In particular embodiments, receiver 71 may receive or detect photons from input beam 63, 64 and generate one or more representative signals. For example, the receiver 71 may generate an output electrical signal 73 that is representative of the input beam 63, 64 and the electrical signal 73 may be sent to controller 72. In particular embodiments, receiver 71 or controller 72 may include a processor, computing system (e.g., an ASIC or FPGA), or other suitable circuitry. A controller 72 may be configured to analyze one or more characteristics of the electrical signal 73 from the receiver 71 to determine one or more characteristics of the target 67, such as its distance downrange from the lidar system 60. This can be done, for example, by analyzing the time of flight or phase modulation for a beam of light 66 transmitted by the light source 61. If lidar system 60 measures a time of flight of T (e.g., T represents a round-trip time of flight for an emitted pulse of light to travel from the lidar system 60 to the target 67 and back to the lidar system 60), then the distance D from the target 67 to the lidar system 100 may be expressed as $D = c \cdot T/2$, where c is the speed of light (approximately $3.0 \times 10^8$ m/s).

In particular embodiments, lidar system 60 may include a scanner 62 configured to scan an output beam 66 across a field of regard of the lidar system 60. As an example, scanner 62 may include one or more scanning mirrors configured to pivot, rotate, oscillate, or move in an angular manner about one or more rotation axes. The output beam 66 may be reflected by a scanning mirror, and as the scanning mirror pivots or rotates, the reflected output beam 66 may be scanned in a corresponding angular manner.

In particular embodiments, a scanning mirror may be attached to a scanner actuator or mechanism which pivots or rotates the mirror over a particular angular range. A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism.

In particular embodiments, scanner 62 may be configured to scan the output beam 66 (which may include at least a portion of the light emitted by light source 61) across a field of regard of the lidar system 60. A field of regard (FOR) of a lidar system 60 may refer to an area, region, or angular range over which the lidar system 60 may be configured to scan or capture distance information. In other embodiments, scanner 62 may be configured to direct the output beam 66 towards specific points in the FOR rather than scanning the output beam across the entire FOR, reducing the number of points captured by the lidar system.

In particular embodiments, a lidar system 60 may be used to determine the distance to one or more downrange targets 67. By scanning the lidar system 60 across a field of regard, the system can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. In particular embodiments, lidar system 60 may be configured to repeatedly capture or generate point clouds of a field of regard at any suitable frame rate. In particular embodiments, a point-cloud frame rate may be substantially fixed, or a point-cloud frame rate may be dynamically adjustable.

Although this disclosure describes or illustrates example embodiments of lidar systems 60 or light sources 61 that produce light waveforms that include pulses of light, the embodiments described or illustrated herein may also be applied to other types of light waveforms, including continuous-wave (CW) light or modulated light waveforms. For example, a lidar system 60 as described or illustrated herein may include a light source 61 configured to produce pulses of light. Alternatively, a lidar system 60 may be configured to act as a frequency-modulated continuous-wave (FMCW) lidar system and may include a light source 61 configured to produce CW light or a frequency-modulated light waveform.

Although FIG. 12 utilizes one or more scanning mirrors to target the output beam, other embodiments of lidar system 60 may be used. In particular embodiments, lidar system 60 may be a flash lidar that captures an entire FOR with a single laser flash. In other embodiments, lidar system 60 may use lasers that are coupled to a mechanically rotating platform.

Figure 13:
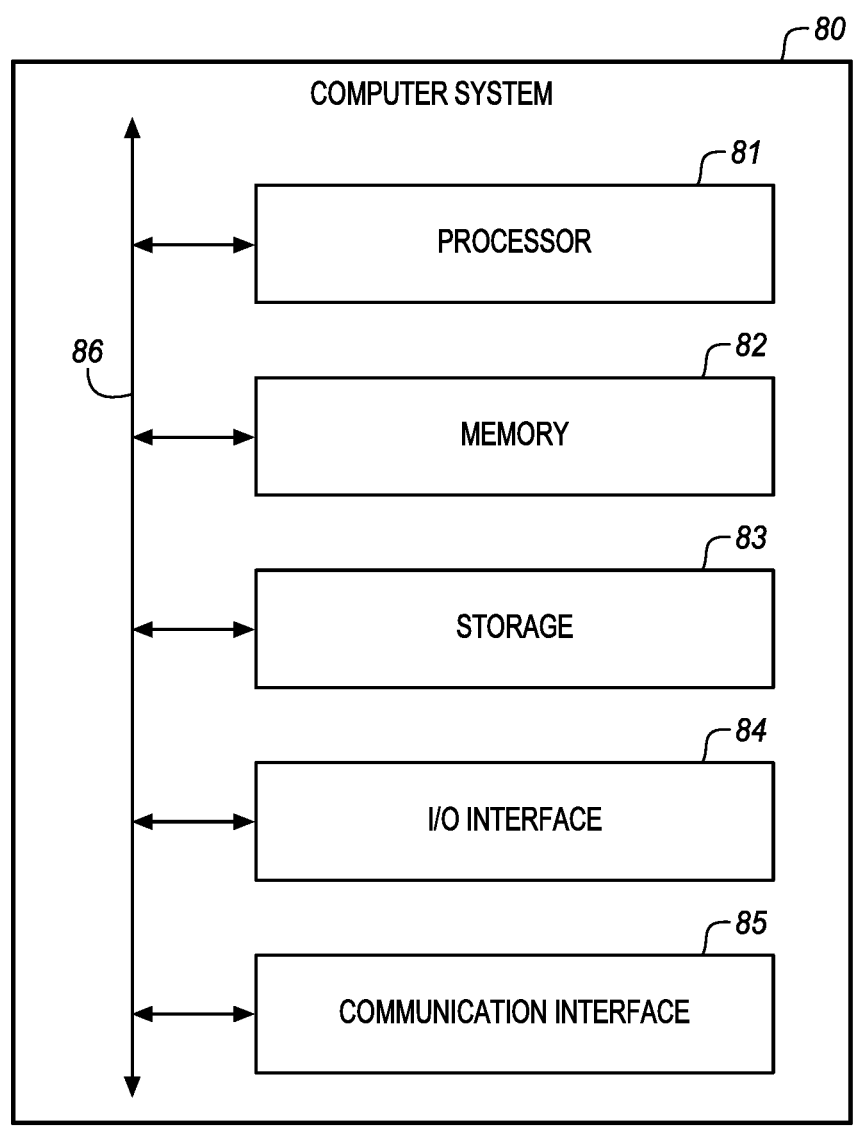
FIG. 13 is a block diagram of an example computer system.

FIG. 13 illustrates an example computer system 80. In particular embodiments, one or more computer systems 80 may perform one or more steps of one or more methods described or illustrated herein. In particular embodiments, one or more computer systems 80 may provide functionality described or illustrated herein. In particular embodiments, software running on one or more computer systems 80 may perform one or more steps of one or more methods described or illustrated herein or may provide functionality described or illustrated herein. Particular embodiments may include one or more portions of one or more computer systems 80. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 80 may take any suitable physical form. As an example, computer system 80 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 80 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 80 may include one or more computer systems 80; be unitary or distributed; span multiple locations; span multiple machines; span multiple data centers; or reside in a cloud, which may include one or more cloud components in one or more networks. Where appropriate, one or more computer systems 80 may perform without substantial spatial or temporal limitation one or more steps of one or more methods described or illustrated herein. As an example, one or more computer systems 80 may perform in real time or in batch mode one or more steps of one or more methods described or illustrated herein. One or more computer systems 80 may perform at different times or at different locations one or more steps of one or more methods described or illustrated herein, where appropriate.

As illustrated in the example of FIG. 13 computer system 80 may include a processor 81, memory 82, storage 83, an input/output (I/O) interface 84, a communication interface 85, or a bus 86. Computer system 80 may include any suitable number of any suitable components in any suitable arrangement.

In particular embodiments, processor 81 may include hardware for executing instructions, such as those making up a computer program. As an example, to execute instructions, processor 81 may retrieve (or fetch) the instructions from an internal register, an internal cache, memory 82, or storage 83; decode and execute them; and then write one or more results to an internal register, an internal cache, memory 82, or storage 83. In particular embodiments, processor 81 may include one or more internal caches for data, instructions, or addresses. Processor 81 may include any suitable number of any suitable internal caches, where appropriate. As an example, processor 81 may include one or more instruction caches, one or more data caches, or one or more translation lookaside buffers (TLBs). Instructions in the instruction caches may be copies of instructions in memory 82 or storage 83, and the instruction caches may speed up retrieval of those instructions by processor 81. Data in the data caches may be copies of data in memory 82 or storage 83 for instructions executing at processor 81 to operate on; the results of previous instructions executed at processor 81 for access by subsequent instructions executing at processor 81 or for writing to memory 82 or storage 83; or other suitable data. The data caches may speed up read or write operations by processor 81. The TLBs may speed up virtual-address translation for processor 81. In particular embodiments, processor 81 may include one or more internal registers for data, instructions, or addresses. Processor 81 may include any suitable number of any suitable internal registers, where appropriate. Where appropriate, processor 81 may include one or more arithmetic logic units (ALUs); may be a multi-core processor; or may include one or more processors 81. In particular embodiments, processor 81 may be a general-purpose single- or multi-chip processor, a digital signal processor (DSP), an ASIC, a FPGA, any other suitable programmable-logic device, discrete gate or transistor logic, discrete hardware components, or any suitable combination thereof.

In particular embodiments, memory 82 may include main memory for storing instructions for processor 81 to execute or data for processor 81 to operate on. As an example, computer system 80 may load instructions from storage 83 or another source (such as, for example, another computer system 80) to memory 82. Processor 81 may then load the instructions from memory 82 to an internal register or internal cache. To execute the instructions, processor 81 may retrieve the instructions from the internal register or internal cache and decode them. During or after execution of the instructions, processor 81 may write one or more results (which may be intermediate or final results) to the internal register or internal cache. Processor 81 may then write one or more of those results to memory 82. One or more memory buses (which may each include an address bus and a data bus) may couple processor 81 to memory 82. Bus 86 may include one or more memory buses. In particular embodiments, one or more memory management units (MMUs) may reside between processor 81 and memory 82 and facilitate accesses to memory 82 requested by processor 81. In particular embodiments, memory 82 may include random access memory (RAM). This RAM may be volatile memory, where appropriate. Where appropriate, this RAM may be dynamic RAM (DRAM) or static RAM (SRAM). Memory 82 may include one or more memories 82, where appropriate.

In particular embodiments, storage 83 may include mass storage for data or instructions. As an example, storage 83 may include a hard disk drive (HDD), a floppy disk drive, flash memory, an optical disc, a magneto-optical disc, magnetic tape, or a Universal Serial Bus (USB) drive or a combination of two or more of these. Storage 83 may include removable or non-removable (or fixed) media, where appropriate. Storage 83 may be internal or external to computer system 80, where appropriate. In particular embodiments, storage 83 may be non-volatile, solid-state memory. In particular embodiments, storage 83 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 83 may include one or more storage control units facilitating communication between processor 81 and storage 83, where appropriate. Where appropriate, storage 83 may include one or more storages 83.

In particular embodiments, I/O interface 84 may include hardware, software, or both, providing one or more interfaces for communication between computer system 80 and one or more I/O devices. Computer system 80 may include one or more of these I/O devices, where appropriate. One or more of these I/O devices may enable communication between a person and computer system 80. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 84 may include one or more device or software drivers enabling processor 81 to drive one or more of these I/O devices. I/O interface 84 may include one or more I/O interfaces 84, where appropriate.

In particular embodiments, communication interface 85 may include hardware, software, or both providing one or more interfaces for communication (such as, for example, packet-based communication) between computer system 80 and one or more other computer systems 80 or one or more networks. As an example, communication interface 85 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 80 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 80 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 80 may communicate using fiber-optic communication based on 100 Gigabit Ethernet (100 GbE), 10 Gigabit Ethernet (10 GbE), or Synchronous Optical Networking (SONET). Computer system 80 may include any suitable communication interface 85 for any of these networks, where appropriate. Communication interface 85 may include one or more communication interfaces 85, where appropriate.

In particular embodiments, bus 86 may include hardware, software, or both coupling components of computer system 80 to each other. As an example, bus 86 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 86 may include one or more buses 86, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 80. As an example, computer software may include instructions configured to be executed by processor 81. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method comprising:
   detecting a voxel in a frame of a lidar corresponding to an external scene, the lidar having a frame rate and a resolution;
   mapping the voxel to a patch in a frame of a camera of the external scene corresponding to the voxel, the patch having a plurality of pixels, each pixel having a plurality of color values, the camera having a camera frame rate and a resolution;
   determining data using the patch of pixels;
   augmenting the voxel with the data of the patch of pixels; and
   delivering the augmented voxel to a perception engine at the lidar frame rate and resolution.

2. The method of claim 1, wherein the voxel has azimuth, elevation and range and wherein the pixel has one or more color values.

3. The method of claim 1, further comprising downscaling the patch to fewer pixels by an amount determined by a range value of the voxel before determining data using the patch.

4. The method of claim 3, wherein downscaling comprises downscaling by an amount inversely proportional to the range.

5. The method of claim 3, further comprising rectifying the lidar frame by rectifying the augmented voxels after the downscaling.

6. The method of claim 1, further comprising determining a motion vector of the patch using adjacent camera frames and wherein augmenting the voxel comprises augmenting the voxel with the motion vector.

7. The method of claim 6, wherein the camera generates three frames for each lidar frame, the method further comprising determining a first motion vector for the first and second adjacent frames of the three frames and determining a second motion vector for the second and third adjacent frames of the three frames and wherein augmenting the voxel comprises augmenting the voxel with the first and the second motion vectors.

8. The method of claim 1, wherein mapping comprises applying calibration from the voxel to a single pixel of the patch.

9. The method of claim 1, wherein mapping comprises mapping the voxel to a single pixel of the camera frame and then assigning a patch to the single pixel as having pixels within a bounding box defined by the single pixel.

10. The method of claim 9, further comprising adjusting the patch using edge detection to exclude pixels outside of a detected edge.

11. The method of claim 1, further comprising adjusting pixels of the patch by projecting motion onto the pixels to account for temporal differences between the patch and the voxel.

12. A scene sensor system comprising:
    a lidar system to generate a point cloud of a scene at a lidar frame rate, the point cloud having a plurality of voxels at a lidar resolution;
    a camera system having a camera to capture a sequence of frames of the scene at a camera frame rate, each frame having a plurality of pixels at a camera resolution; and
    a fusion processor configured to map voxels of the point cloud to a respective patch in a camera frame, each patch having a plurality of pixels, each pixel having a plurality of color values, to determine data using the respective patches, and to augment the voxels with the data of the respective patch to generate an annotated point cloud configured for use by a perception engine.

13. One or more computer-readable non-transitory storage media embodying software that is operable when executed to perform operations comprising:
    detecting a voxel in a frame of a lidar corresponding to an external scene, the lidar having a frame rate and a resolution;
    mapping the voxel to a patch in a frame of a camera of the external scene corresponding to the voxel, the patch having a plurality of pixels, each pixel having a plurality of color values, the camera having a camera frame rate and a resolution;
    determining data using the patch of pixels;
    augmenting the voxel with the data of the patch of pixels; and
    delivering the augmented voxel to a perception engine at the lidar frame rate and resolution.

14. A method comprising:
    detecting a voxel in a frame of a lidar corresponding to an external scene, the lidar having a lidar frame rate and a resolution;
    mapping the voxel to a patch in a frame of a camera of the external scene corresponding to the voxel, the camera having a camera frame rate and a resolution, the patch having a plurality of pixels, each pixel having a plurality of color values;
    determining a motion vector of the patch using adjacent camera frames;
    augmenting the voxel with the motion vector; and
    delivering the augmented voxel at the lidar frame rate and resolution to a perception engine.

15. The method of claim 14, wherein the camera generates three frames for each lidar frame, wherein determining a motion vector comprises determining a first motion vector for the first and second adjacent frames of the three frames and determining a second motion vector for the second and third adjacent frames of the three frames and wherein augmenting the voxel comprises augmenting the voxel with the first and the second motion vectors.

16. The method of claim 14, further comprising downscaling the patch to fewer pixels before determining the motion vector, the method further comprising determining color data using the downscaled patch and augmenting the voxel with the determined color data.

17. The method of claim 16, wherein downscaling comprises downscaling by an amount determined by a range value of the voxel.

18. The method of claim 16, wherein downscaling comprises downscaling by an amount inversely proportional to the range.

19. The method of claim 16, wherein the augmented voxel includes azimuth, elevation range, motion, and color for a plurality of pixels.

20. The method of claim 14, further comprising rectifying the camera frame by rectifying the augmented voxels.

* * * * *